Sept. 23, 1969  P. H. WINTER  3,468,394
CENTRIFUGAL FANS AND AIR CUSHION VEHICLES INCORPORATING SUCH FANS
Filed Feb. 28, 1967  2 Sheets-Sheet 1

INVENTOR
PETER HERON WINTER

BY
Lackenbach & Lust
ATTORNEYS

Sept. 23, 1969  P. H. WINTER  3,468,394
CENTRIFUGAL FANS AND AIR CUSHION VEHICLES INCORPORATING SUCH FANS
Filed Feb. 28, 1967  2 Sheets-Sheet 2

INVENTOR
PETER HERON WINTER
BY
Lockenbach & Leager
ATTORNEYS

United States Patent Office 3,468,394
Patented Sept. 23, 1969

3,468,394
CENTRIFUGAL FANS AND AIR CUSHION VEHICLES INCORPORATING SUCH FANS
Peter H. Winter, Cowes, Isle of Wight, England, assignor to Britten-Norman Limited, Helens, Isle of Wight, England, a corporation of Great Britain
Filed Feb. 28, 1967, Ser. No. 619,425
Claims priority, application Great Britain, Mar. 1, 1966, 9,050/66
Int. Cl. B60n *1/00;* F04d *27/00;* F02k *1/00*
U.S. Cl. 180—117                                    4 Claims

ABSTRACT OF THE DISCLOSURE

A centrifugal fan having a volute-shaped casing with a tangential outlet and a circumferential extension of the volute terminating in a second outlet, and means to shut off either outlet and deliver air through the other outlet. The invention is also shown as applied to an air cushion vehicle, in which the pressure air from the tangential outlet is used for forward propulsion of the vehicle, and pressure air from the circumferential outlet is used for braking or directional control of the vehicle.

---

This invention relates to centrifugal fans and has especial, but not exclusive, application to air cushion vehicles which employ such fans for propulsion. The use of centrifugal fans for the propulsion of air cushion vehicles mounted so as to produce a jet of air rearwards has the advantage over the more conventional use of air propellers that it is relatively much quieter owing to the smaller tip speed for the same thrust. The air jet formed has also the advantage that it can be deflected by simple vanes to make a very powerful control force.

All air cushion vehicles require a powerful reverse thrust, and it is an object of the invention to provide a centrifugal fan which may be employed in such a vehicle to provide such thrust.

According to the invention, a centrifugal fan having a volute with a substantially tangential outlet has a circumferential extension of the volute terminating in a second outlet, and means to shut off either the tangential outlet or the circumferential extension. The means may comprise a pivoted vane arranged to be moved from a position in which it shuts off the circumferential extension, to permit the air to be delivered through the tangential outlet, to a position in which it shuts off the tangential outlet, to permit the air to be delivered through the circumferential extension. Preferably the pivot of the vane is so located in the volute that the resultant of the air loads passes through or close to said pivot.

The invention also includes an air cushion vehicle having at least one such fan for propulsion, the tangential outlet being directed rearwardly and arranged to provide thrust for forward propulsion, and the circumferential extension being directed forwardly and arranged to provide reverse thrust.

Figure 1:
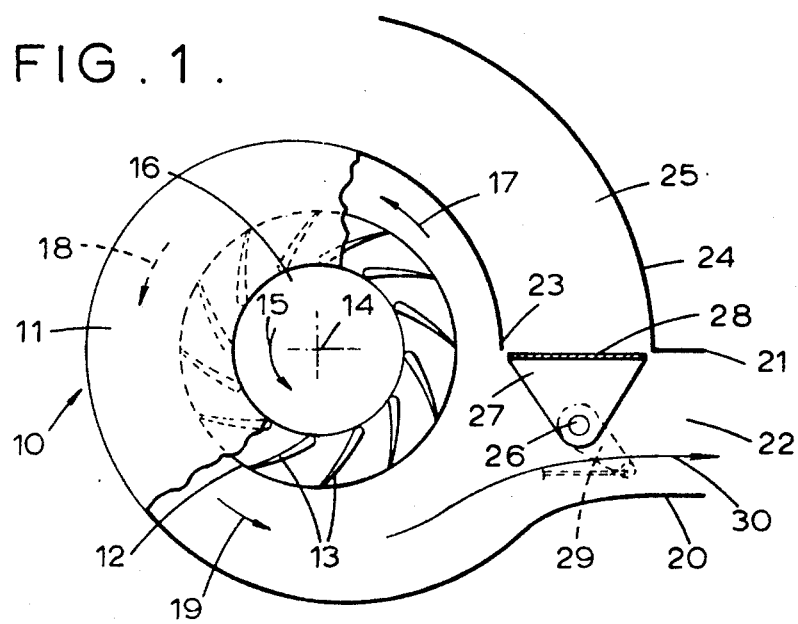
Figure 2:
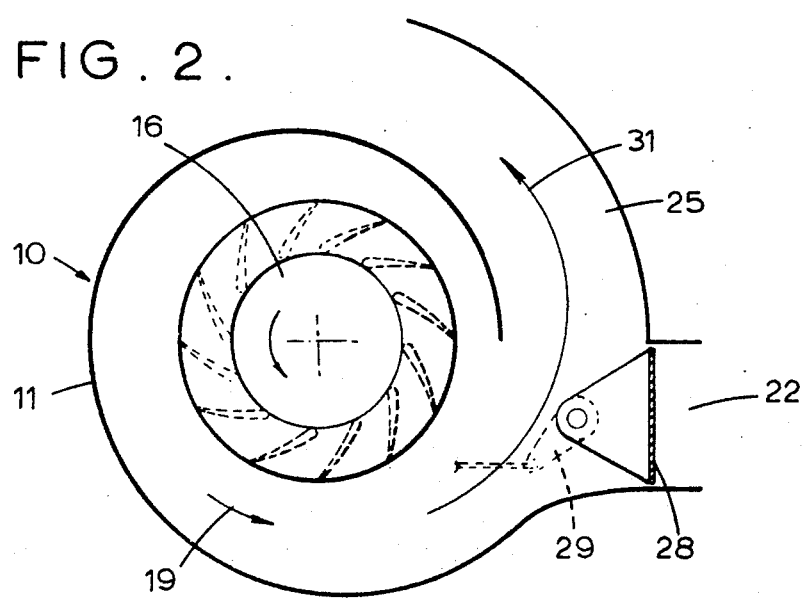

Embodiments of the invention will be described with reference to the accompanying drawings, in which:

FIGURE 1 is a diagrammatic representation in sectional elevation of a centrifugal fan incorporating the invention and arranged to provide normal thrust, FIGURE 2 is a similar diagrammatic representation showing the fan arranged to provide reverse thrust, and FIGURE 3 is a three-quarter rear perspective view of an air cushion vehicle showing one application of the invention.

Referring to FIGURES 1 and 2, a centrifugal fan 10 is contained in a casing 11 constituting a volute. An impeller 12 having blades 13 is arranged to rotate about an axis 14 in the direciton of the arrow 15. Air is drawn in through an air inlet 16 in a direction parallel with the axis 14 and is forced around the inside of the volute casing in the direction indicated by arrows 17, 18, and 19. Such an arrangement is well-known in the art, and requires no further description.

The wall 20 forming a tangential extension of the volute casing 11 is also orthodox, but the opposite wall 21, which together with the wall 20 defines an outlet duct 22, does not extend inwardly to join the portion 23, as in the usual construction, but runs circumferentially, as at 24, to define with the portion 23 an extension duct 25.

At the junction of the ducts 22, 25 there is a pivot 26, mounted at its ends in opposite walls of the casing, and on which are pivotable lugs such as 27, carrying a vane 28. A lever arm 29 secured to one end of the pivot 26 which projects through a wall of the casing enables the vane 28 to be moved from one position to another.

In FIGURE 1 the vane 28 is shown as obturating the circumferential duct 25, so that pressure air following the path indicated by the arrow 19 passes along the tangential outlet duct 22, as indicated by the arrow 30.

In FIGURE 2 the vane 28 is shown as having been moved by operation of the lever arm 29 to a position where it obturates the tangential outlet duct 22. In consequence, pressure air following the path indicated by the arrow 19 continues as shown by the arrow 31, and passes out through the circumferential duct 25, ultimately travelling in a direction directly opposite to that of the normal pressure air delivery from the duct 22.

The vane 28 is pivoted so that the resultant of the air loads always passes through or close to the pivot 26, so that the torque required to move the vane 28 is small. By this means some 80 percent of the forward thrust may be obtained for reverse.

FIGURE 3 shows the invention as applied to a plenum chamber air cushion vehicle. The general features of such craft are well known in the art and need not be described in any great detail. The vehicle has a hull 40 having a dependent skirt 41 and enclosing a plenum chamber 39 served with pressure air by centrifugal fans 42, 43 having downwardly directed outlet ducts such as 44 communicating directly with the plenum chamber 39. Propulsion fans 45, 46 have rearwardly directed ducts 47, 48 which will be referred to in greater detail hereinafter. The fans are driven from a power unit (not shown) through conventional gearboxes 49, 50. The fan inlets face outwardly, as shown at 51, 52. The general arrangement of the components of the vehicle is not material to the invention, except that it must have rearwardly directed propulsion ducts.

The arrangements in the propulsion ducts are identical but are right- and left-handed and it will be sufficient to describe the structure of the port propulsion fan 45. It will be seen that this fan is arranged in the form shown diagrammatically in FIGURE 1. The vane 28 is pivotally mounted at 26 in the walls of the duct 47 and the vane is operable about its pivot by the lever arm 29, which is actuated by a control 53 of the Bowden cable type, which passes forward to the cockpit, where it is secured to a pedal 54 pivotally mounted at 55 on the floor of the cockpit. The lever arm 29 is restrained by a spring 56 secured to the wall of the duct 47. Above the duct 47 there is a circumferential duct 57 passing upwardly and forwardly in the manner of the duct 25 of fan 10. At its outlet end the duct 57 is provided with a thrust door 58 pivoted at 59 so as to be able to be swung upwardly and rearwardly, and the thrust door 60 above the starboard propulsion fan 46 is in fact shown in a raised position and pivoting about its pivot 59. The port thrust doors 58 and 60 are operable between their closed position, in which the port thrust door 58 is shown in FIG. 3, and their open position, in which the port thrust door 60 is shown in that figure, against the action of a spring 62. This may be accomplished in any suitable and conventional manner. The spring 62 also acts as a stop limiting its upward travel.

The arrangements of the starboard propulsion fan 46, apart from being handed oppositely to those of the port fan 45, are in other respects identical. The starboard vane 28 is, it will be seen, in the position indicated in FIGURE 2, while the starboard thrust door 60 is in the open position.

In operation, for normal forward travel both port and starboard vanes 28 are in the position shown in FIGURE 1 and also shown for the port fan in FIGURE 3. Pressure air therefore emerges horizontally and rearwardly from the apertures 22 at the rear of the propulsion fan ducts 47 and 48.

When it is desired to make use of reverse thrust, the pedals 54 and 64 are depressed. The starboard pedal 64 (shown depressed), operating through the Bowden cable 53 and lever arm 56, moves the vane 28 to the position shown for the starboard vane in FIGURE 3 and as shown in FIGURE 2. Simultaneously the starboard thrust door 60 is raised against the action of its spring 62 to the position illustrated in FIGURE 3. Operation of the port pedal 54 will have also brought the port vane 28 and the port thrust door 58 to the same positions. The airflow represented in FIGURE 2 now obtains for both the propulsion fans, and the propulsion air emerges from the thrust doors horizontally and forwardly, enabling the vehicle to be rapidly brought to rest.

The use of only one of the thrust doors may be employed in directional control of the vehicle. Thus, if the starboard pedal 64 is depressed and the port pedal 54 is not depressed, operation of the starboard vane 28 and starboard thrust door 62 to bring them to the position shown in FIGURE 3 will cause a reverse thrust on the starboard side of the vehicle during the maintenance of the normal thrust on the port side. This will induce a very rapid turn to starboard.

I claim:

1. An air cushion vehicle having a chamber on the lower side thereof and open to a surface over which said vehicle is adapted to travel, and means for introducing and maintaining a cushion of pressurized air within said chamber, and at least one propulsion fan for providing thrust for said vehicle, said fan comprising a volute having a substantially tangential outlet directed generally rearwardly of said vehicle and arranged to provide thrust for forward propulsion and a circumferential extension of the volute terminating in a second outlet directed generally forwardly of said vehicle and arranged to provide reverse thrust, and control means for shutting off either the tangential outlet or the circumferential extension.

2. An air cushion vehicle as defined in claim 1, wherein the control means comprises a pivoted vane arranged to be moved from a position in which it shuts off the circumferential extension, to permit the air to be delivered through the tangential outlet, to a position in which it shuts off the tangential outlet, to permit the air to be delivered through the circumferential extension.

3. An air cushion vehicle as defined in claim 2, wherein the pivot of the vane is located in the volute so that the resultant of the air load passes substantially through said pivot.

4. An air cushion vehicle as defined in any one of claims 1, 2 and 3 wherein there is provided a pair of said propulsion fans disposed in laterally spaced apart relationship, having control means for providing independent thrust reversal for providing directional control.

References Cited

UNITED STATES PATENTS

| 752,956 | 2/1904 | Clifford. | |
| 3,162,260 | 12/1964 | Cockerell | 180—129 X |

FOREIGN PATENTS 418,544  9/1925  Germany.

A. HARRY LEVY, Primary Examiner

U.S. Cl. X.R.

60—229; 230—114; 244—53, 55